June 29, 1965 W. S. MILLER 3,191,495
PROJECTION SCREEN
Filed March 14, 1963
2 Sheets-Sheet 1
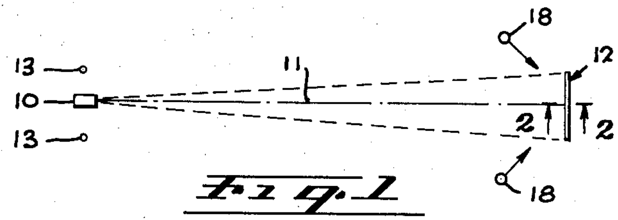
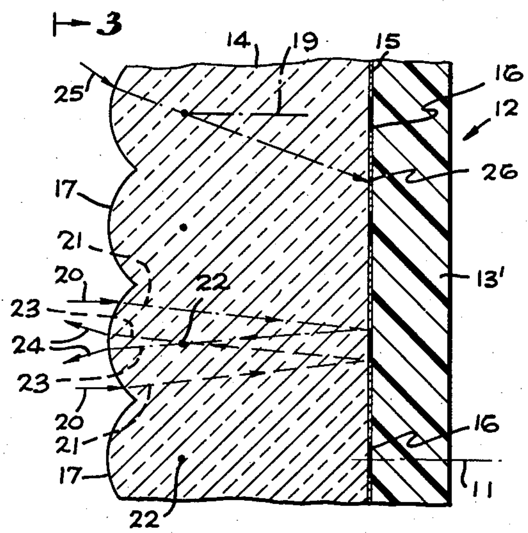
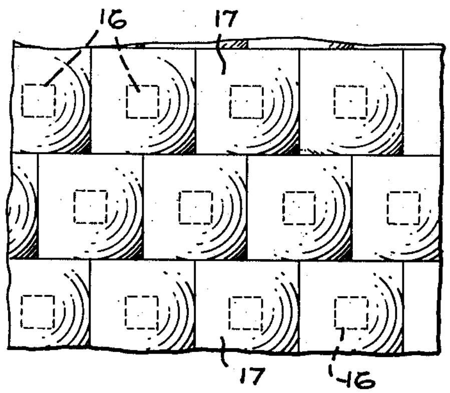
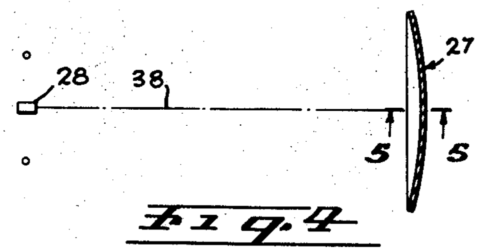
INVENTOR.
WENDELL S. MILLER
BY William P. Green
ATTORNEY June 29, 1965 W. S. MILLER 3,191,495
PROJECTION SCREEN
Filed March 14, 1963 2 Sheets-Sheet 2
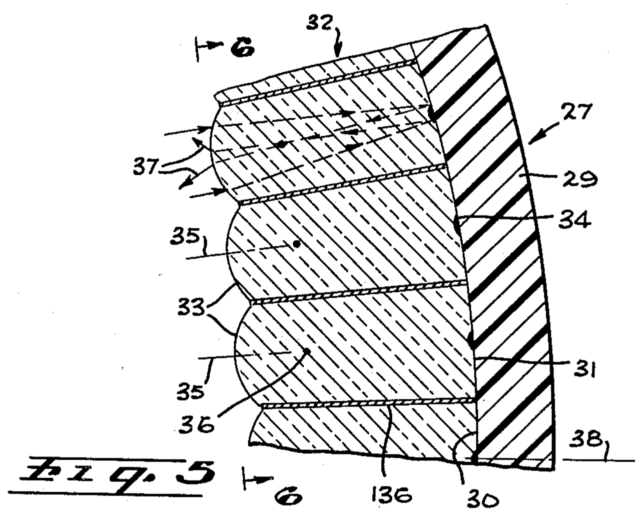
Fig. 5
Fig. 7
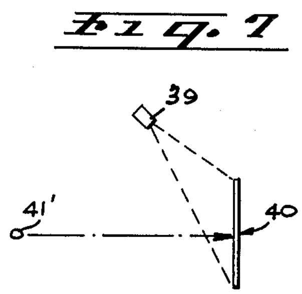
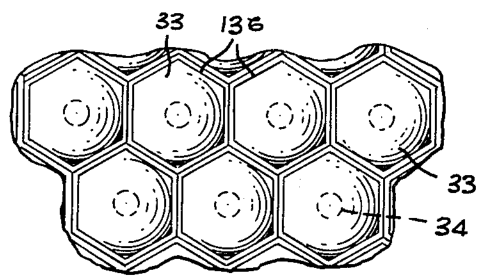
Fig. 6
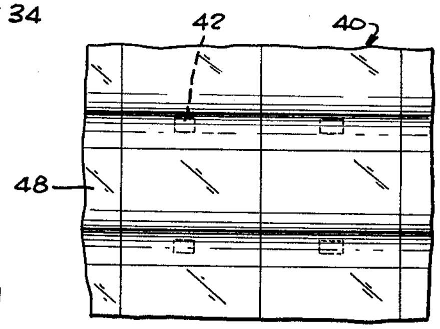
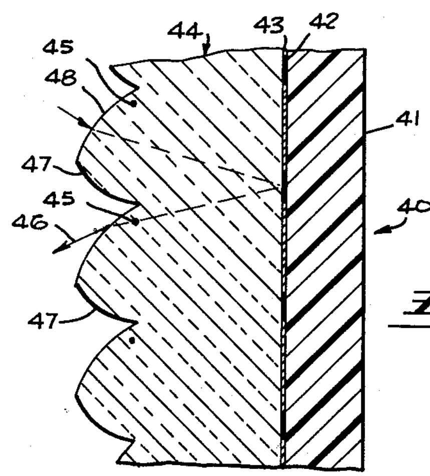
Fig. 9
Fig. 8
INVENTOR.
WENDELL S. MILLER
BY William P. Green
ATTORNEY United States Patent Office 3,191,495

Patented June 29, 1965

3,191,495

PROJECTION SCREEN

Wendell S. Miller, 1341 Comstock Ave., Los Angeles, Calif.

Filed Mar. 14, 1963, Ser. No. 265,167
3 Claims. (Cl. 88—28.9)

This invention relates to an improved projection screen for use in displaying an illuminated image produced on the screen by a projector.

In using either motion picture or still projectors, it is normally necessary to darken the room within which the projector and its viewing screen are located, in order to render the produced image sufficiently visible for satisfactory viewing. This is true because ambient light falling on the screen from windows, room lights, or other light sources tends to illuminate the portions of the image which are intended to be dark, and thereby reduce the contrast and visibility of the image.

The general object of the present invention is to provide an improved projection screen which is so constructed as to inherently avoid illumination by ambient or stray light, and to be illuminated primarily and selectively by light from a predetermined projector location, in a manner such that a viewer sees a desired projected image, in proper contrast, regardless of the presence or absence of additional light sources at other locations. More specifically, the screen may be designed to contain an internal light trap, which acts to absorb the unwanted light and remove it from view, while directing light from the projector in substantially undiminished form to the viewing location. As will appear, the invention is primarily adapted for use in screens of the front projection type, that is, screens in which the viewer is located at the same side of the screen as is the projector, rather than rear projection screens in which the viewer and projector are at opposite sides of the screen.

To attain the discussed results, the screen includes a large number of relatively small mirrors which are distributed in spaced relation at different locations across the area of the screen, and onto which the light from different portions of the projected image is directed. In combination with the various mirrors, there are provided individual light directing means, for receiving the light from the different portions of the image, and purposely directing that light onto the respective mirrors. These light directing means desirably take the form of lens elements associated with the mirrors respectively, and positioned to direct light onto the mirrors, for reflection by the mirrors to a viewing location. The viewer then sees a composite image consisting of a large number of areas distributed across the screen, and illuminated differently in accordance with the amount of light reflected by the different individual mirrors. As the light emits from the screen, the lenses may again affect the path of the light, this time desirably spreading it in a manner rendering the overall image readily visible from any location within a relatively wide viewing angle relative to the screen. Thus, an audience of substantial size may view the image without affecting its advantageous characteristics of high contrast in spite of the presence of ambient light.

To assure the transmission to the viewing location of only the light from the projector, there are provided between the various mirrors in the screen intermediate areas of light absorptive material, so positioned as to receive and absorb without reflection light which enters the screen from a source other than the projector. Also, I find it desirable to incorporate in the apparatus partitions which are located between the various paths of light to the different mirrors respectively, and which act to prevent light from one mirror system from crossing into another system and thus destroying or partially destroying the results otherwise attained by the screen. These partitions preferably take the form of a honeycomb-like pattern isolating each lens and mirror system from all adjacent systems.

The above and other features and objects of the invention will be better understood from the following detailed description illustrated in the accompanying drawing in which:

FIG. 1 is a diagrammatic representation of a first form of projector and screen system embodying the invention;

FIG. 2 is a greatly enlarged transverse section taken on line 2—2 of the screen in FIG. 1;

FIG. 3 is a fragmentary front view taken on line 3—3 of FIG. 2;

FIG. 4 is a view similar to FIG. 1, but showing a system utilizing a curved different type of screen;

FIG. 5 is an enlarged fragmentary section taken on line 5—5 of the curved screen in FIG. 4;

FIG. 6 is a fragmentary front view taken on line 6—6 of FIG. 5;

FIG. 7 is a diagrammatic representation of a third projector and screen system;

FIG. 8 is an enlarged fragmentary vertical section through the screen of FIG. 7; and FIG. 9 is a front view taken on line 9—9 of FIG. 8.

Referring first to FIG. 1, I have illustrated at 10 in that figure a projector (either of the still or motion picture type) which projects an illuminated image along axis 11 onto the front side of a viewing screen 12 which is disposed essentially transversely of axis 11. The projected picture may be of conventional rectangular outline, and screen 12 may therefore be of rectangular configuration as viewed from the projector location. The projected picture is to be seen from the projector side of the screen, typically from locations such as the two viewing points designated 13 in FIG. 1.

It may be assumed that ambient light is approaching the screen 12 from locations offset laterally from the projector, as from the sources 18, with the screen being purposely constructed in the manner discussed hereinbelow to internally trap the light from sources 18 and avoid reflection of that light to the viewers.

The sectional view of FIG. 2 illustrates in greatly enlarged form a portion of the screen 12, which may be considered as a portion at and near axis 11, as illustrated. From FIG. 2, it will be apparent that the screen consists of a rear sheet or layer 13 of a first material, and a second or forward layer 14. These two layers have abutting surfaces which meet and are bonded together at 15 in a plane disposed transversely of axis 11. At the interface 15, there are formed a large number of small spaced mirrors 16, forming reflective surfaces lying in the plane of the interface and adapted to reflect light coming from the projector back to the left and toward the projector location. Mirrors 16 may be formed by locally silvering the rear surface of forward element 14. Light falling on the interface 15 at locations between the various mirrors 16 is absorbed by the material of rear plate 13, which is specially formed to be light absorptive and not reflective, and capable of substantially completely absorbing all light impinging upon the material of part 13. For this purpose, element 13 may typically be formed of a suitable resinous plastic material, such as polymethylmethacrylate, containing a black dye rendering the plastic completely light absorptive.

The forward layer or part 14 is transparent to light, so that light from the projector may enter this material, fall upon mirrors 16, and be reflected by those mirrors back through the material of part 14 to the viewing locations. It is desirable that part 14 be formed of a material having the same refractive index as rear plate 13, to prevent Fresnel reflection at interface 15. Also, it is preferred that the two materials have the same coefficient of expansion. Elements 13 and 14 may be bonded together by an adhesive, preferably also having the same refractive index and coefficient of expansion as parts 13 and 14. Where part 13 is formed of polymethylmethacrylate containing black dye, part 14 may be formed of completely transparent undyed polymethylmethacrylate, with the adhesive for securing the parts together being of the same material.

Directly forwardly of and opposite each of the reflective mirror areas 16, the front surface of part 14 forms a forward lens surface 17 for directing projected light onto the associated mirror surface. Each of the lens surfaces 17 is convex, and may be generally spherical, and has its individual axis 19 (or axis 11 in the case of the center lens system) directed to the center of the associated mirror 16. Each lens surface 17 is so shaped as to cause convergence of all light falling on the lens from the projector, such as the two light rays designated 20 in FIG. 2, toward and onto the associated mirror 16 (see the converging rays 21). These various rays are then directed forwardly by mirror 16, and preferably are caused by the lens and mirror to focus at a point 22 located between the mirror and lens, and normally closer to the lens than to the mirror. After passing through this point of focus, the light within a particular one of the lens systems advances beyond the focus point, and diverges as indicated at 23, to ultimately be further spread at 24 upon final exiting passage through the forward lens face 17. Each mirror 16 is preferably of a size corresponding substantially exactly to the reduced cross sectional area occupied (in the plane of interface 15) by the light which has come from the projector and been refracted by the lens face 17 associated with that particular mirror. Thus, any light coming from another location, such as either of the points 18 of FIG. 1, is in most cases directed by the various lens faces 17 to points other than the areas occupied by mirrors 16, to thereby fall upon the intermediate light absorptive areas of plate 13 and be absorbed thereby. For example, the ray of light designated 25 in FIG. 2 follows the course represented in that figure to ultimately fall on the forward light absorptive surface of plate 13 at a point such as that designated 26, and be absorbed by the plate without reflection to the viewer. The amount of light from extraneous sources which may ultimately fall on the mirror areas is extremely small, and has very little effect on the contrast of the ultimate viewed image.

As a viewer looks at the forward side of screen 12, say from one of the points 13 in FIG. 1, he sees a large number of spots of light apparently originating at the various focal points 22 to the rear of the different individual lens faces 17, with the light from all of these various points forming together a composite image corresponding to that carried by the film within projector 10. By virtue of the spreading of the light from these different points, as indicated at 24 in FIG. 2, the image may be viewed at any of numerous different points within a very wide possible viewing angle, while the internal light trap structure is effective to filter out unwanted ambient light or extraneous source light regardless of where the viewer may be located within this permissible angle.

FIGS. 4 through 6 are similar to FIGS. 1 to 3 respectively, but show a different form of screen 27 which is typically curved essentially spherically about the location of projector 28. This curvature is employed to facilitate the effectiveness with which the various individual lens and mirror portions of the screen 27 receive and reflect their corresponding portions of the image.

As seen in FIG. 5, screen 27 includes a rear plate 29 having a forward concave partial spherical surface 30 abutting against and adhesively bonded to the correspondingly curved spherical rear surface 31 of a forward plate assembly 32. Forward assembly 32 forms a number of individual lenses having front lens faces 33 which direct light from different portions of the projected image onto rear mirrors 34. These mirrors may in this case be formed by silvering small concave dimple like recesses formed in the rear surface of structure 32, to form in effect small individual convex mirrors (typically spherical). The axis 35 of each lens face 33 is aimed directly toward projector 28, and passes through the center of the corresponding convex mirror 34. As will be apparent from FIG. 5, the various lenses and their mirrors are disposed at angles which progressively increase toward the periphery of the mirror, to attain the desired axial relationships, with the concave curvature of the overall mirror assembly being designed to enable such progressive change in angularity of the lens systems. As in the first form of the invention, the projected light received by each lens face 33 occupies substantially exactly the same cross section as does the corresponding mirror 34, when the light reaches the mirror location, so that any extraneous light from another source will in all probability fall on the unsilvered portions of rear plate 29, between the mirror areas.

The light falling on each mirror 34 is reflected forwardly, with this mirror and its associated lens 33 being purposely designed to focus the light falling on that particular lens and mirror system from the projector at a point such as that designated at 36 in FIG. 5. Since the convexity of mirror 34 assists in this focusing the light, it is possible to utilize a smaller mirror when of the convex shape than when a flat mirror of the type shown in FIG. 2 is employed. This, then, increases the effectiveness of the intermediate unsilvered light trap area.

For positively preventing unwanted transmission of light laterally from one of the lens and mirror systems to another, there are provided in the FIGS. 4 through 6 arrangement a number of opaque light absorptive partitions 136, extending in a front to rear direction, and disposed about each of the lenses. These partitions may form the honeycomb pattern illustrated in FIG. 6, and may extend the entire front to rear distance from lens faces 33 to the location of interface 30–31. Partitions 136 may typically be formed of any light absorptive material which can be fabricated to the illustrated shape, such as a suitable black metal, black glass patttern, honeycomb of black plastic, or the like. The lens material located within the honeycomb, and extending in a front to rear direction between surfaces 33 and 31, is a transparent material such as that utilized in part 14 of FIG. 2, typically transparent methyl methacrylate. The material of rear plate 29 is a light absorptive material, such as methyl methacrylate containing black dye, secured to the forward structure at the location of surfaces 30 and 31 by an adhesive of the type discussed in connection with the first form of the invention.

The functioning of the screen of FIGS. 4 through 6 is very similar to that of the first form of the invention. As illustrated in FIG. 5, light entering each of the convex lens faces 33 from projector 28 is directed along a converging path to fall on the associated mirror 34, and be reflected back forwardly by that mirror to the focal point 30. In advancing forwardly beyond the focal point, the light rays first diverge, and are then spread on increasingly divergent paths at 37 by passage through lens surface 33 for the second time. In this way, the large number of individual lens and mirror systems form together a composite image which may be viewed over a relatively wide viewing angle, and whose contrast is not affected substantially by light emanating from sources offset laterally from the projector. Such unwanted light is directed by the lens faces onto the light absorptive portions of surface 30, with the light trapping effect being maximized by the provision of honeycomb partition structure 136 preventing lateral transmission of light between the different systems. The main lens of the projector and screen system in FIG. 4 is designated 38, with this axis being represented as extending through one of the lens systems in FIG. 5.

FIGS. 7 through 9 show another variational form of the invention in which the projector 39 is aimed toward screen 40 at an angle, to produce an image which is viewed from a location offset from the projector, such as that designated 41 in FIG. 7. To enable this offset type of viewing, the screen 40 may have the configuration illustrated at FIG. 8, including a rear light absorptive plate 41, having localized mirrors 42 formed at its forward side in the plane of interface 43. Front element 44 may have inclined and spherically curved lens faces or surfaces 48 through which light passes to be directed onto corresponding ones of the mirrors 42 (associated with the different surfaces 48). Each of the spherical surfaces 48 is shaped to converge the light falling thereon from the projector onto a predetermined one of the mirrors, and to ultimately bring the light to a focus at a point 45 behind a second one of the faces 48. This light then emits through the second of the faces 48 and is spread by that face as indicated at 46, to be visible through a wide viewing angle. Opaque light absorptive material, such as a suitable black paint, may be painted onto the downwardly facing inclined surfaces 47 of the element 44, to absorb stray light. Because of this unique configuration, only the light from the projector reaches the viewing location, and any light falling on the screen from extraneous sources is in most cases directed by the lens surfaces onto the light absorptive portions of the element 41 between mirrors 42, or if reflected by the mirrors falls on the light absorptive surfaces 47.

The mirror surfaces at 16, 34 and 42 are meant to be regions of high reflectivity but need not be perfectly specular. In fact, a small amount of diffuse reflectivity is helpful in relieving bright spot problems in the projected images. However, it is intended that these mirror areas shall have at least a highly directional reflective pattern.

What is claimed as new is:

1. A projection screen onto which an illuminated image is to be directed by a projector comprising a plurality of mirrors distributed at different locations spaced across the area of said image for receiving light from different portions of the image and reflecting it toward a viewer, a body of transparent material forwardly of said mirrors having a front surface forming a plurality of curved lens faces for directing light from said different portions of the image onto said different mirrors respectively, and light absorptive means between the locations of said mirrors for absorbing which comes from sources other than the projector and does not fall on said mirrors, said front surface of said body of transparent material forming a plurality of additional faces extending betwen different ones of said lens faces and coated with light absorptive material, said lens faces being inclined in generally a predetermined direction relative to said mirrors to receive light from an angularly offset projector location, so that the projector light may enter one of said lens faces and leave through the other after reflection by a mirror, said additional faces being inclined essentially in an opposite direction.

2. A projection screen onto which an illuminated image is to be directed by a projector comprising a plurality of mirrors distributed at different locations spaced across the area of said image for receiving light from different portions of the image and reflecting it toward a viewer, transparent material forwardly of said mirrors forming a plurality of curved forward lens faces which are disposed essentially at an oblique angle to said mirrors to receive light from a laterally offset projector location, said lens faces being shaped to direct light from said different portions of the image onto said different mirrors respectively, and light absorptive means between the locations of said mirrors for absorbing light which comes from sources other than the projector and does not fall on said mirrors, each of said lens faces and an associated one of said mirrors being shaped to focus light from one of said portions of the image at a point forwardly of the mirror, and to direct said light outwardly through another of said lens faces.

3. A projection screen onto which an illuminated image is to be directed by a projector comprising a plurality of reflectors distributed at different locations spaced across the area of said image for receiving light from different portions of the image and reflecting it toward a viewer, a body of transparent material forwardly of said reflectors having a front surface forming a plurality of curved lens faces for directing light from said different portions of the image onto said different reflectors respectively, and light absorptive means between the locations of said reflectors for absorbing light which comes from sources other than the projector and does not fall on said reflectors, said front surface of said body of transparent material forming a plurality of additional faces extending between different ones of said lens faces and coated with light absorptive material, said lens faces being inclined in generally a predetermined direction relative to said reflectors to receive light from an angularly offset projector location, so that the projector light may enter one of said lens faces and leave through the other after reflection by a reflector, said additional faces being inclined essentially in an opposite direction.

References Cited by the Examiner

UNITED STATES PATENTS

| | | | |
|---|---|---|---|
| 1,883,290 | 10/32 | Ives | 88—28.9 X |
| 1,942,841 | 1/34 | Shimizu | 88—28.93 |
| 2,018,592 | 10/35 | Arnulf | 88—28.93 X |
| 2,131,974 | 10/38 | Saint Genies | 88—28.93 X |
| 2,292,152 | 8/42 | Newcomer | 88—28.93 |
| 2,351,033 | 6/44 | Gabor. | |
| 2,991,693 | 7/61 | MacNeille | 88—28.9 |
| 3,014,403 | 12/61 | Alofs | 88—28.9 X |

JULIA E. COINER, *Primary Examiner*.